United States Patent Office.

HARDY L. SHEFFER, OF MARSTON, WISCONSIN.

Letters Patent No. 103,512, dated May 24, 1870.

IMPROVED MEDICAL COMPOUND FOR THE CURE OF DIPHTHERIA.

The Schedule referred to in these Letters Patent and making part of the same.

I, HARDY L. SHEFFER, of Marston, in the county of Juneau, in the State of Wisconsin, have invented certain Improvements in Medical Compound, of which the following is a specification.

Nature and Object of the Invention.

The object of my invention consists in mixing various medicinal articles to form a compound for the cure of diphtheria and other diseases.

General Description.

I take about a gallon of raw linseed-oil, and put into it about two ounces of camphor-gum, and about one ounce of oil origanum, about one ounce of oil of cedar, about one ounce of oil sassafras, and about one ounce of oil of hemlock, and shake them up, and they will mix and make an oil, which I call the "Oil of Life," which, when used as described, will cure diphtheria, croup, rheumatism, and many other diseases.

This oil should be taken as follows:

For diphtheria, sore throat, croup, &c., both internally and externally; and for burns, bruises, &c., apply it externally, and rub it with the hand.

Claim.

I claim as my invention—
The composition substantially as described.
HARDY L. SHEFFER.

Witnesses:
O. GRAY,
CECIL ROGERS.